United States Patent Office 3,209,157
Patented Sept. 28, 1965

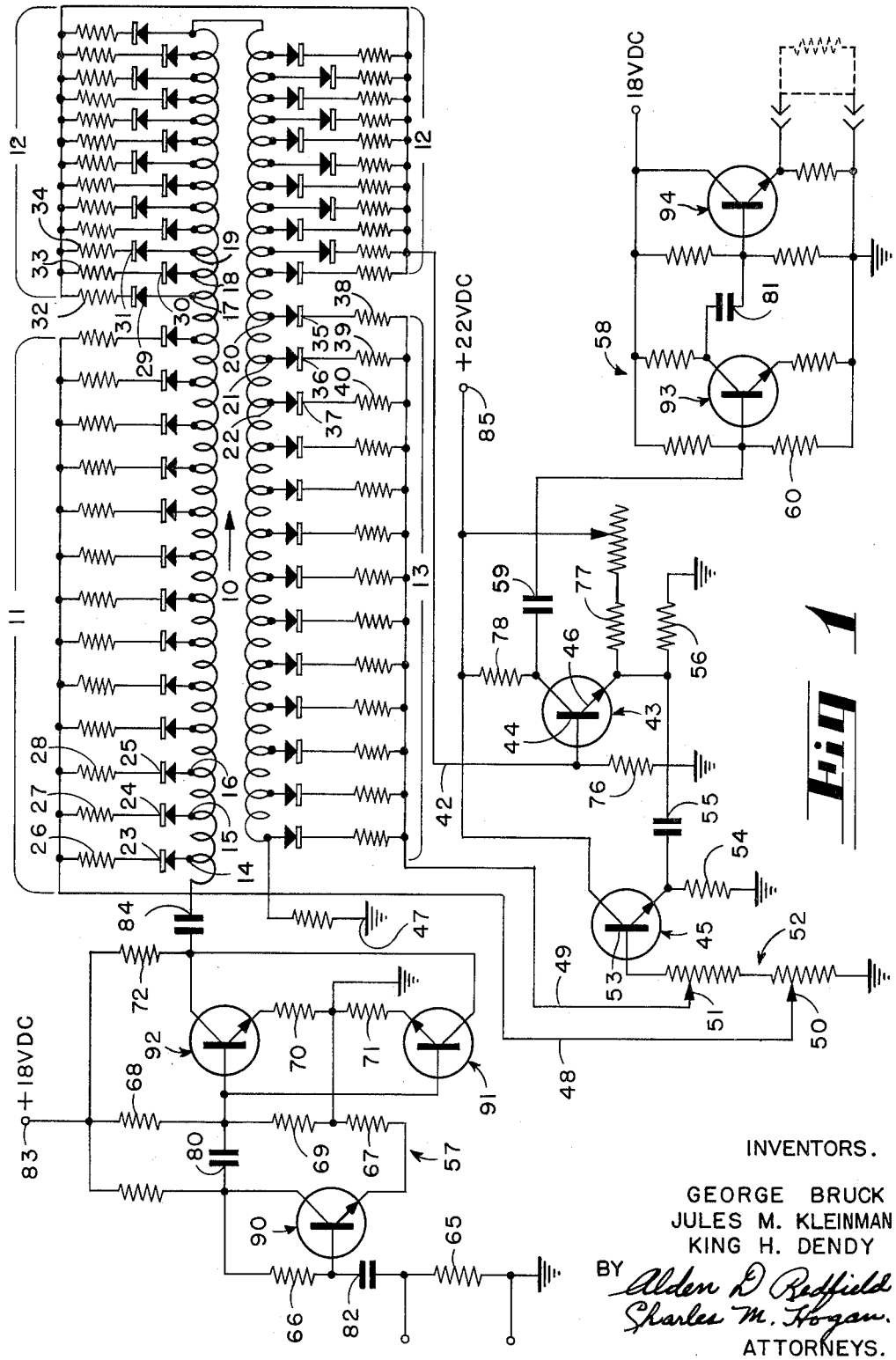

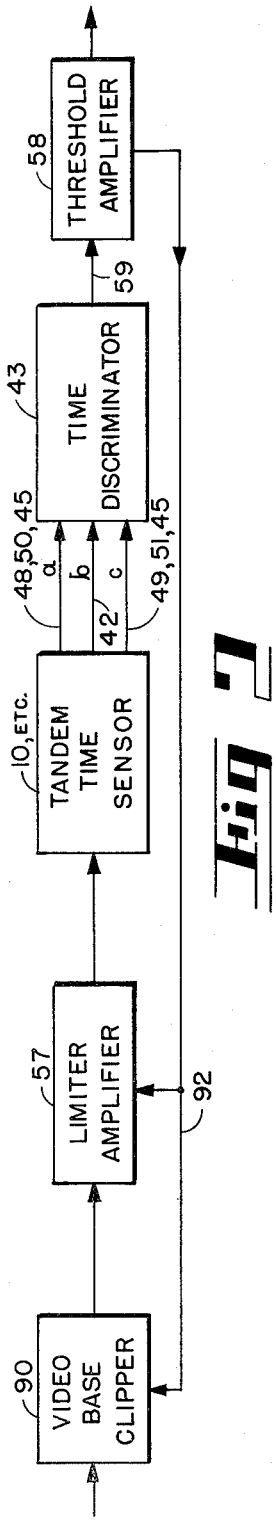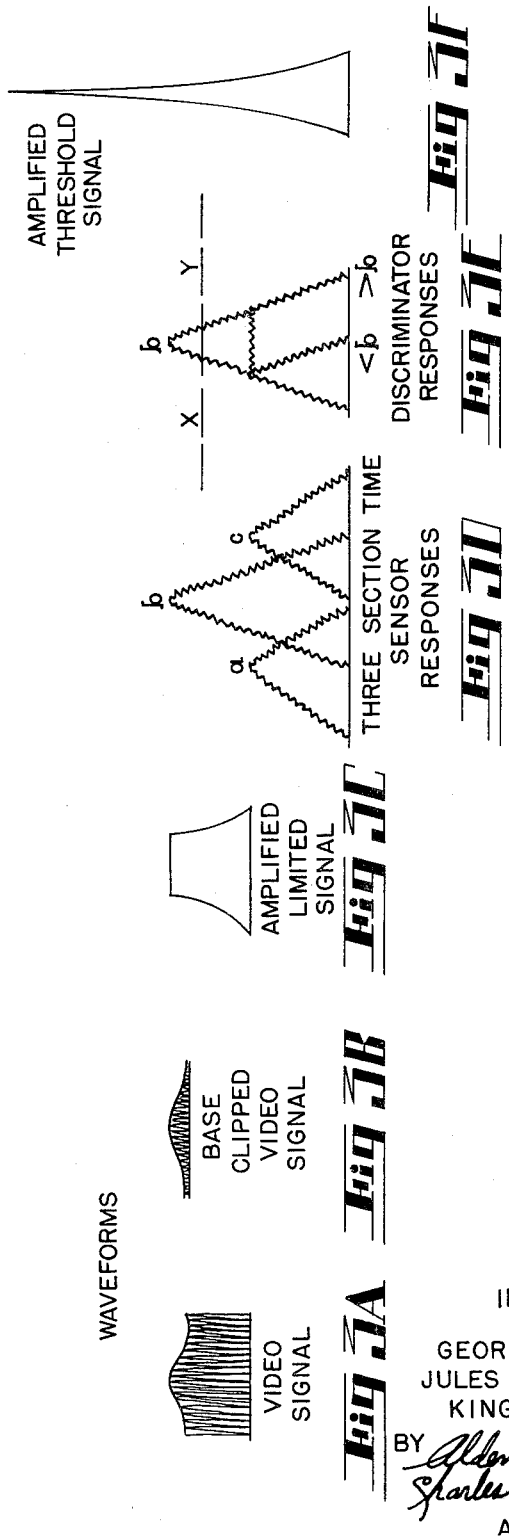

3,209,157
PULSE WIDTH SENSOR
George Bruck, Cincinnati, Ohio, Jules M. Kleinman, Los Angeles, Calif., and King H. Dendy, Scottsdale, Ariz.; said Bruck and said Kleinman assignors to Avco Corporation, Cincinnati, Ohio, a corporation of Delaware
Filed July 17, 1959, Ser. No. 827,958
4 Claims. (Cl. 307—88.5)

This invention relates to pulse width discriminator circuits and particularly to the type operative to produce an output pulse having an amplitude variable in accordance with the width of the applied pulse.

One objective of this circuit is to provide a relatively simple device which utilizes more of the information contained in an input signal pulse than do the commonly used differentiating-delay-coincidence-detection circuits or the RC integrating type circuits. Both of these well-known circuits present disadvantages and limitations which are avoided by the invention. For example, the coincidence detector samples only two points in time and "knows nothing" of the character of the input pulse between these check points. It cannot distinguish between the desired signal and two narrow pulses so spaced that the time between the leading edge of the first and the trailing edge of the second pulse is equal to the desired pulse width. The RC integrator, while sampling the signal for the entire duration of the pulse, imposes band width limitations and cannot distinguish between several closely spaced narrow pulses and a single pulse of the correct width.

Accordingly, the principal object of the invention is to provide a reliable pulse width discriminator operable in the presence of noise signals of essentially the same magnitude as the desired signal.

The invention features a multiple-tapped, dispersive type, lumped constant delay line. The pulse width discriminator in accordance with the invention samples the signal as small increments in time to determine its acceptability, and it utilizes the sampled data in such a way that signal pulses of the desired predetermined width produce large amplitude output signals, while undesired pulses produce little or no ouptut. Operating in this manner, the circuit displays an accuracy of pulse width measurement comparable to that of a pulse generating system, even in the presence of large pulses or groups of pulses of incorrect duration. The invention is not limited thereto, but is of particular utility in radar applications, and the circuit recognizes pulses of the desired width even in the presence of noise and interference of the same order of magnitude.

The expression "pulse" as herein employed designates a momentary flow of energy of such relative duration that it may be considered as an isolated phenomenon.

For a better understanding of the present invention, together with other and further objects, advantages, and capabilities thereof, reference is made to the following description of the appended drawings, in which:

FIG. 1 is a circuit schematic of a preferred embodiment of a sampling type pulse width discriminator in accordance with the invention;

FIG. 2 is a block diagram of a typical system featuring the invention; and

FIGS. 3A, 3B, 3C, 3D, 3E, 3F comprise a set of illustrative wave forms provided to facilitate the description of the operation of the invention.

In accordance with the invention, there is provided a pulse width sensor (FIG. 1) comprising an electrical pulse delay line 10, said line having first, second, and third sections 11, 12, and 13, respectively, each tapped at multiple points such, for example, as those designated 14, 15, 16, 17, 18, 19, 20, 21, and 22. Individual diodes 23, 24, 25, etc., are connected in circuit between the taps of the first section and resistors 26, 27, 28, etc., for sampling an input pulse as it travels through the first section. The diodes of a second group, numbered 29, 30, and 31, for example, are similarly connected to taps 17, 18, and 19, respectively, of the second section and placed in circuit with resistors 32, 33, and 34, respectively. The third section includes similarly connected diodes 35, 36, and 37, and resistors 38, 39, and 40, for example. Only three diodes in each section have been discussed above, but it will be understood that the first section comprises an illustrative thirteen similar diodes, the second section includes an exemplary number of diodes such as twenty-four, and the third section similarly has thirteen diodes in the preferred embodiment shown.

The second and third sections sample an input pulse as is passes through the second and third sections, respectively.

All of the resistors of the second section are connected to a common output line 42 coupled into the input circuit of a differential amplifier transistor 43 which includes means responsive to a pulse being propagated through the second section to produce an output signal when the propagated pulse is of a predetermined length comparable to the electrical length of the second section. This means includes the input to the base 44 of an NPN transistor. The invention further comprises means coupled to the diodes of the first and third sections for inhibiting amplification in stage 43 or otherwise opposing the action of the signal applied to base 44 when a propagated pulse exceeds in width said predetermined length and has a trailing portion appearing in the first section of a leading portion appearing in the third section, or both, as a pulse being sampled in the second section actuates transistor 43. This means comprises a transistor 45, input connections back to the first and third sections, and an output coupling to the emitter 46 of transistor 43.

The rationale behind the invention is that an input pulse is sampled in the second section by a series of "and" gates, producing a step function output of triangular configuration and attaining a predetermined peak magnitude when the pulse is of the desired duration. The resultant output is applied to the base of transistor 43 and amplified. The input pulse is similarly sampled in the first section and in the third section, so that if it is too wide the first and third sections produce similar step function outputs which are applied, via transistor 45, to the emitter input of transistor 43, thus inhibiting amplification therein.

To this end, there is provided the delay line or artificial transmission line 10 consisting of three sections, each tapped at multiple points. A ground connection is established at 47. Each section has connections from the multiple taps to a plurality of groups of diodes, as described above. The diodes of the second section are connected by line 42 to the base 44 of transistor 43 of the differential amplifier in such a manner that the energizing of the group of diodes tends to render transistor 43 more conductive. The outputs of the first and third sections are connected by lines 48 and 49, respectively, to adjustable contacts 50 and 51, respectively, of a potentiometer 52 which is connected between ground and base 53 of an emitter follower transistor 45. The emitter resistor 54 of this circuit is RC coupled, as by capacitor 55 and emitter resistor 56, to the emitter 46 of the differential amplifier transistor 43 in such a way that signal output from either or both of the first and third sections tends to render transistor 43 less conductive, thus inhibiting the action of the second delay line section thereon. The driving and final output stages illustrated in FIG. 1 are conventional, the reference numeral 57 designating the driving circuit coupled to the input of the delay line 10 and the reference numeral 58 designating a suitable, otherwise conventional two-stage amplifier coupled by capacitor 59 and resistor 60 to the collector output of the differential amplifier stage transistor 43.

Referring now to the circuitry as incorporated in a system, reference is made to FIG. 2. FIG. 2 shows, in cascade, a video base clipper 90, a limiter amplifier 57 (also shown as 57 in FIG. 1), a tandem line sensor 10, etc. (comprising the delay line and associated groups of diode gates shown in FIG. 1), a time discriminating device 43 (the transistor 43 and associated connections in FIG. 1), and a threshold amplifier 58 (being the output circuitry shown at 58 in FIG. 1). Continuing with the description of FIG. 2 and making reference also to the various wave forms in FIG. 3, the signal to be examined (FIG. 3A) is processed by means of the base clipper circuit 90, adjusted to accept only those signals above the average noise level and producing the output wave form illustrated in FIG. 3B. This adjustment is controlled as shown in FIG. 1, but may be made to operate automatically if so desired. The elevated-pedestal video signal is then limited in the pre-amplifier-driver network. This limiter may be tied in with the output threshold control, manually or by means of appropriate and well-known circuitry indicated by the reference numeral 92 (FIG. 2), made to follow automatically any desired level of operation.

Signal output from the limiter (FIG. 3C) proceeds into and down the first section of the delay line. As it is propagated along the line (i.e., is dispersed in time), the "and" gates or diode circuits are successively excited and a signal is built up progressively, depending on the length of signal application. This summed voltage (indicated by the wave form $a$ in FIG. 3D) is applied to transistor 45 at the selected level, controlled by potentiometer 52. The signal is power amplified by transistor 45 and applied to the emitter of transistor 43.

The signal then proceeds into the second section of the line and similarly starts building up a step-type voltage (wave form $b$ in FIG. 3D) which is applied to the base of transistor 43. This differential amplifier 43 compares the magnitude of these wave forms and responds in proportion to their difference. Further progression of the signal into the third section provides a wave form ($c$ in FIG 3D) which is applied also to the base of transistor 45 at the proper level determined by means of potentiometer 52 to compensate for the attenuation encountered in the delay line. This again provides a signal which is applied to the emitter of transistor 43 after being power amplified by means of transistor 45.

It will be observed that the amplitude response from each line section will decay essentially as the reverse of the rise characteristic as the signal passes. That is to say, the maximum response in the second section will be realized when all gates are actively excited. The differential amplifier 43 is set up to pass only a wave form entirely within the second section, in order to give the maximum amplitude. If a wave form exists entirely along the second section and has in addition either a trailing portion in the first section or a leading portion in the third section, or both, then the output of transistor 45 attenuates (i.e., inhibits the amplification of) transistor 43. Further, a wave form which is not sufficient in length to extend completely across the second section will be lower in amplitude. This discrimination may be threshold-set (by adjustment of a rheostat in series with resistor 77) so that the system recognizes only those pulses rising above a predetermined amplitude at the output of the differential amplifier. It will be observed that, by increasing the number of sampling points and the gain of the differential amplifier, the width of the output pulse can be controlled to a very high degree of accuracy with reference to the desired pulse width.

Attention is now invited to the curves of FIGS. 3D and 3E. The stepped-triangular wave forms $a$, $b$, and $c$ of FIG. 3D indicate, respectively, the output wave forms of the first, second, and third sections plotted with amplitudes as ordinates against time as abscissae. The showing of FIG. 3D postulates that the input wave form is sufficiently long that, as it traverses the second section, it has a substantial trailing portion in the first section and a substantial leading portion in the third section, so that the triangles $a$ and $c$ overlap the triangle $b$.

Referring now to the wave forms of 3E, and assuming that the input wave form is substantially shorter than the electrical length of the second section, in that event the output wave of transistor 43 will have a form consisting of a rising portion and a falling portion which ends at an illustrative point indicated by the expression $<b$, the maximum amplitude of the wave being substantially below the threshold indicated by the reference line XY. If the input wave form is of the desired length, then the maximum amplitude of output is attained and the output wave form reaches the amplitude indicated at $b$. Now, then, suppose that the input is greater in length than the second section. In that event the output wave rises, then progresses flatly horizontally, and ends at a point such as is indicated by $>b$. In other words, an input wave which is too short results in a low amplitude output wave of triangular form, and an input wave which is too long results in an output wave of truncated triangular form. Only an output wave approximating the desired width exceeds the threshold value XY. A typical over-all desired output signal which results when the desired input wave of predetermined length is applied to the system as illustrated in FIG. 3F. That is to say, there is a spiked pulse output only when the input pulse is of the desired width.

Two significantly important advantages over known pulse width discriminators are realized by the use of our novel circuitry:

(1) It may be made operable at a threshold only slightly above the average white noise level; and (2) The multiple sampling procedure prevents pulse trains of equivalent width to that of the desired pulse from deceiving the system. The coincident pulse width discriminator employing the rise and fall characteristic of the pulse provides essentially no reliable information therebetween as is the case with comparator types. Well-known pulse discriminators permit any number of pulses to exist in the interval without recognition so long as a rise and a fall period, and/or summed amplitude, accommodates the discriminator.

Our novel circuitry offers further advantages in counter-counter-measure efforts. If the desired pulse is recognized among the jamming signals, it can be selected for gating and similar control purposes.

Another way of viewing the operation of this device is this: as received undesired video impulses of very short width travel down the line, the second sampling section is not entirely actuated, and therefore little or no output is obtained from the differential amplifier 43. Video impulses of the desired duration cause the second sampling section alone to be entirely actuated, and a pulse of maximum amplitude is obtained in the output. In the case of a video pulse that is of longer duration than that desired, the three sections are actuated, and the first and third inhibit the amplification of the output of the second, so that again the over-all result is that a considerably truncated output is obtained.

The accuracy of the system may be enhanced by variation of the threshold level (shown as XY in FIG. 3E). That is to say, the signal output may be confined to a signal above a threshold level near to the top of the amplified peak $b$.

While there has been shown and described what is at present considered to be the preferred embodiment of our invention, it will be understood by those skilled in the art that various changes and modifications may be made therein without departing from the true scope of the invention as defined by the appended claims.

We claim:

1. A pulse width sensor comprising a delay line, said delay line having an input circuit at one end and being tapped at multiple points along its electrical length; first, second, and third dispersive sampling networks located in succession along said line, each network comprising groups of resistance-diode circuits individually connected to taps on said line; and means for differentially combining the signal output of said second network and the combined signal outputs of the first and third networks for producing an output wave form which is of maximum amplitude and in excess of a predetermined threshold value when all of the resistance-diode circuits of the second network, and no more, are actuated in response to a continuous wave train of desired duration, said output wave form being of lesser amplitude and less than said theshold value when any of the diode-resistance circuits of the first and third networks is actuated by said train, or when less than all of the diode-resistance circuits of the second network are actuated.

2. A pulse width discriminator comprising a delay line, said line having first, second, and third sections each tapped at multiple points; a first group of diode gate circuits individually connected to the taps of the first section for sampling a wave train as its travels through said first section, a second group of diode gate circuits individually connected to the taps of said second section for sampling said wave train as it passes through said second section, and a third group of diode gate circuits individually connected to the taps of said third section for sampling said wave train as it travels through said third section; amplifier means responsive to a wave train being propagated through said second section to produce an output wave form of maximum amplitude and in excess of a predetermined threshold value when said propagated wave train is of a predetermined continuous length comparable to the length of said second section; and means coupled to the first and third groups of diode gate circuits for opposing the action of the amplifier means so that the output wave form amplitude is below said threshold when an input wave train exceeds in length said predetermined length and has a trailing portion appearing in the first section or a leading portion appearing in the third section as the amplifier means is actuated.

3. A pulse-discriminating circuit for coupling to a source of video signals, comprising, in combination: means for base-clipping said signals; means for limiting the output of the clipper means; a delay line coupled to the limiting means, said delay line having an input circuit at one end and an output circuit at the other end thereof; first, second, and third multi-element dispersive sampling networks located in succession along said line between said input and output circuits; differential amplifier means for differentially combining the output of said second network and the combined signal outputs of said first and third networks for producing an output signal which is of maximum amplitude and in excess of a predetermined threshold level when all of the elements of the second network are actuated and of lesser amplitude and below said level when any of the elements of the first and third networks is actuated or when less than all of the elements of the second network are actuated; and adjustable amplifier means coupled to said output circuit for establishing said threshold level.

4. The combination in accordance with claim 3 and feedback control means coupled between said adjustable amplifier means and said limiting means.

References Cited by the Examiner
UNITED STATES PATENTS

| | | | |
|---|---|---|---|
| 2,585,803 | 2/52 | Longmire | 328—111 |
| 2,874,279 | 2/59 | Miller | 328—112 |
| 2,912,579 | 11/59 | Bates | 328—111 |
| 2,922,039 | 1/60 | Shuhalla | 328—111 |

FOREIGN PATENTS

| | | |
|---|---|---|
| 572,379 | 3/59 | Canada. |

ARTHUR GAUSS, *Primary Examiner.*

FREDERICK M. STRADER, CHESTER L. JUSTUS,
*Examiners.*

UNITED STATES PATENT OFFICE
CERTIFICATE OF CORRECTION

Patent No. 3,209,157 September 28, 1965

George Bruck et al.

It is hereby certified that error appears in the above numbered patent requiring correction and that the said Letters Patent should read as corrected below.

Column 1, line 38, for "as" read -- at --; column 2, line 31, for "of" read -- or --; column 4, line 28, for "as" read -- is --.

Signed and sealed this 19th day of April 1966.

(SEAL)
Attest:

ERNEST W. SWIDER
Attesting Officer

EDWARD J. BRENNER
Commissioner of Patents